(No Model.)

S. W. BROWN.
Can Protector and Lifter.

No. 238,564.        Patented March 8, 1881.

WITNESSES:
A. Schehl
C. Sedgwick

INVENTOR:
S. W. Brown
BY
ATTORNEYS.

N. PETERS, PHOTO-LITHOGRAPHER, WASHINGTON, D. C.

UNITED STATES PATENT OFFICE.

SARAH W. BROWN, OF HUDSON, NEW YORK.

CAN PROTECTOR AND LIFTER.

SPECIFICATION forming part of Letters Patent No. 238,564, dated March 8, 1881.

Application filed February 5, 1881. (No model.)

*To all whom it may concern:*

Be it known that I, SARAH W. BROWN, of Hudson, in the county of Columbia and State of New York, have invented a new and Improved Can Protector and Lifter, of which the following is a full, clear, and exact description.

In canning fruit, &c., much difficulty and inconvenience is often experienced in introducing the cans or jars into the vessel of water and withdrawing them therefrom, and great care must be exercised to prevent the contact of the jars, if they be of glass, with the bottom of the vessel or boiler, lest the jar be broken.

The object of this invention is to provide a simple, inexpensive, and convenient device for overcoming these difficulties; and the invention consists of a shallow basket or frame, preferably of wire, into which the jar is set, provided with a swinging bail or handle that is designed to extend above the jar for the operator to take hold of, and of a ring sliding on said bail, and designed by contact with the jar, when the latter is in position, to steady it and at the same time to hold the bail upright.

Figure 1:
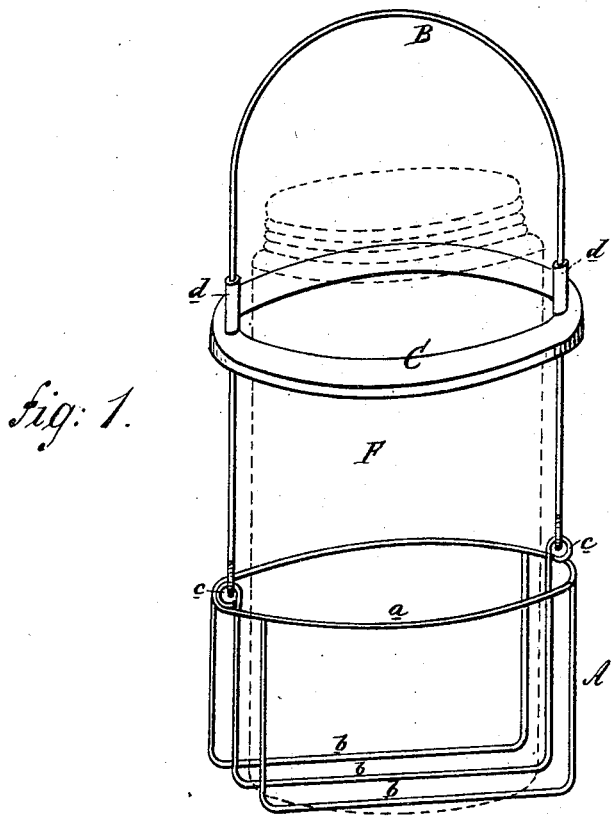
Figure 2:
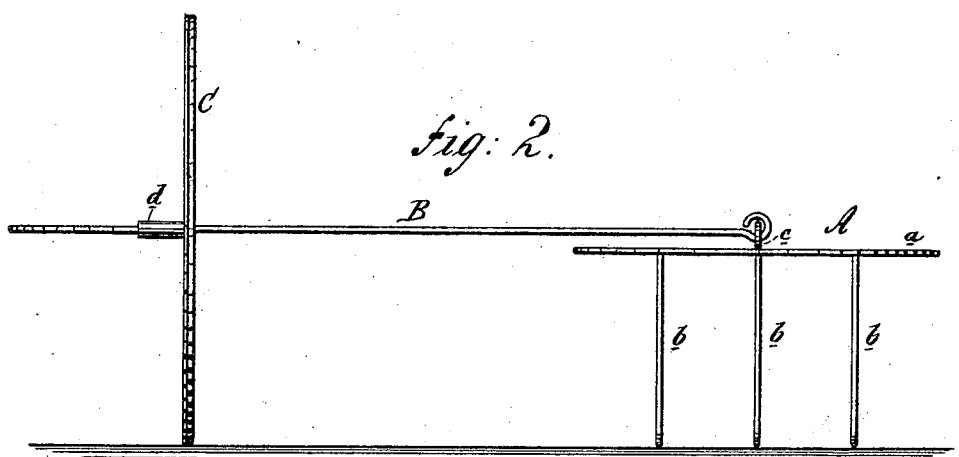

Figure 1 is a perspective view of the device with a jar in position for removal or introduction from or into the boiler, the jar being shown in dotted lines. Fig. 2 is a side elevation of the device in position for a jar to be introduced or removed therefrom.

Similar letters of reference indicate corresponding parts.

In the drawings, A represents the basket or frame of the device, consisting of a horizontal ring, *a*, on which are secured several depending loops, *b b*, bent to conform with the shape of the bottom of a jar. The ends of the largest and central loop, *b*, are extended above the ring *a* and formed into eyes, in which are linked the ends of the bail B, as shown at *c*. A flat ring, C, provided with opposite tubular lugs *d*, slides up and down on said bail B, the legs of said bail B being passed through said lugs *d*. Said lugs *d* may be dispensed with in some instances and the bail B pass through simple perforations in the ring C.

In order to introduce a jar into or remove it from the protector and lifter, the bail B and ring C are turned down in the position indicated in Fig. 2, so that the jar can be readily set in or taken from the basket or frame A. Then the bail B is raised to a vertical position and the ring C pushed down about the can or jar F, as shown in Fig. 1. In this position the said can or jar F can be safely and conveniently handled and put in and taken from the boiler without trouble, while the loops *b* serve to keep the bottom of said jar F from the bottom of the boiler, or from contact with any object whereby said jar F might easily be broken.

I do not confine myself to the precise construction herein shown, as modifications in the device may be made without departing from my invention.

Having thus described my invention, I claim as new and desire to secure by Letters Patent—

1. As an improved article of manufacture, a can protector and lifter constructed substantially as herein shown and described, consisting of a shallow basket, A, swinging on bail B, and ring C, sliding on bail B, arranged and operating as set forth.

2. In a can protector and lifter, the combination, with the basket or frame A, consisting of ring *a* and depending loops *b*, of the bail B and sliding ring C, provided with tubular lugs *d*, substantially as and for the purpose described.

3. In a can protector and lifter, the combination, with the bail B, of the sliding ring C, substantially as herein shown and described, whereby said bail is held in an upright position about the can or jar, as set forth.

SARAH WIESMER BROWN.

Witnesses:
 R. E. BROWN,
 CHARLES RACE.